INVENTOR.
Jerome H Rynkowski
BY
Harness, Dickey & Pierce
ATTORNEYS

INVENTOR.
Jerome A. Rynkowski
BY
Harness, Dickey & Pierce
ATTORNEYS

United States Patent Office 3,513,372
Patented May 19, 1970

3,513,372
SYSTEM AND METHOD FOR DETECTING WHEN THE DAMPED OSCILLATORY ERROR SIGNAL OF A SERVOMECHANISM IS NULLED
Jerome A. Rynkowski, Warren, Mich., assignor to Cadillac Gage Company, Warren, Mich., a corporation of Michigan
Filed Mar. 23, 1966, Ser. No. 536,891
Int. Cl. G05b 5/01
U.S. Cl. 318—30                                    19 Claims

ABSTRACT OF THE DISCLOSURE

This invention relates generally to a system and method for detecting the occurrence of preselected conditions in a damped oscillatory wave train and more specifically to a detecting system and method for sensing a damped oscillatory wave train and detecting the condition of the wave train wherein the amplitude of oscillation approaching a preselected null is within predetermined limits for a specified period of time.

A servo system wherein position and reference signals are generated, the two being compared to derive a control signal for controlling the drive mechanism of a massive object and successively reversing the drive of the massive object as it seeks the selected position to bring the object closer and closer to the selected position in a series of alternating progressively diminishing movements. The control system includes a system for sensing the difference between the actual position and the selected position and comparing this difference to a reference level. When the difference between the difference signal and reference level is within preselected limits, a timing cycle is initiated to detect the duration that the signal is within the limits. If the signal remains within the limits for a preselected time, an output signal is generated from the control circuit. If the difference signal exceeds the preselected limits, the timing cycle is terminated and reinitiated when the difference again comes within limits.

BACKGROUND AND SUMMARY OF THE DISCLOSURE

In certain applications of a conventional positioning servo system, wherein a slave unit is positioned in response to an electrical signal generated by a transmitting unit, it has been found desirable to provide an indication of the condition wherein the slave unit is within preselected limits of achieving the commanded position. However, a large number of positioning servo systems are unable to stop at exactly the commanded null position due to various factors within the system, for example the inherent amount of hunting of a particular servo system. The hunting factor is directly related to the inertia of the slave member being positioned and also the power being utilized in positioning the slave member. Thus an oscillation of the slave unit being positioned occurs about the null point, the amplitude of oscillation being affected, among others, by the above noted factors, and the duration of the oscillations is directly related to the damping factors inherent in the system.

Thus, in detecting the null position, to merely sense an error signal indicative of the proximity of the slave unit to the commanded null position may provide a faulty indication of the stability of the system due to the fact that the error signal is merely an instantaneous indication of the relative position of the slave unit with respect to the null. In accordance with the present invention a method and system has been devised which relates the error signal to predetermined limits of oscillation wherein the error signal remains within those predetermined limits of oscillation for a preselected duration of time before detection.

In accordance with the present invention a transmitting servo system is provided wherein a portion of the servo system is positioned by movement in a preselected direction. The positioning of the portion of the transmitting system provides a control signal to a slave system wherein an element of the slave system is positioned in accordance with the positioning of the transmitting system. During the positioning process of the slave servo system, an error signal is developed which corresponds to the difference between either the selected position for the slave servo and its actual position. Systems may be devised wherein the error signal may be generated through comparison of the position of the slave system with respect to a reference.

As is readily apparent, the hunting of the slave system about its preselected null position will cause the error signal to assume the form of a damped oscillatory wave train which diminishes in amplitude about the null position as time progresses. Means has been provided for sensing the error signal, particularly the amplitude thereof, and a timing sequence is initiated at such time as the amplitude of the error signals falls within certain preselected limits. This timing sequence is terminated when the amplitude exceeds the set predetermined limits. At such time as an error signal is generated having an amplitude which is totally within the preselected limits, the timing sequence is permitted to "time out" and this "timing out" process is sensed by means of a control means or detector means and an indicating signal may be generated in response thereto.

Accordingly, it is one object of the present invention to provide an improved null detecting system.

It is another object of the present invention to provide an improved method of detecting preselected characteristics of a damped oscillatory wave train.

It is still another object of the present invention to provide an improved method of detecting the occurrence, in a damped oscillatory wave train, of a timed relationship with the amplitude of the oscillatory wave train.

It is still another object of the present invention to provide an improved method of detecting when an object moving in an oscillatory manner about a preselected position with an amplitude which diminishes with time is at said preselected position within preselected amplitude limits.

It is still a further object of the present invention to provide an improved method of detecting when an oscillating electrical wave train is within preselected voltage amplitude limits.

It is still another object of the present invention to provide an improved method for use in a positioning servo system wherein the slave unit moves in an oscillatory manner about a selected position and the amplitude of oscillation diminishes with time wherein the method provides an indication when the slave system is within preselected limits of the null position for a predetermined period of time.

It is still a further object of the present invention to provide an improved null detecting system for use in conjunction with an object moving in an oscillatory manner about a selected position wherein means is provided for sensing the amplitude of oscillation within preselected limits.

It is still another object of the present invention to provide an improved null detecting system for use in a servo system wherein a control device is actuable upon the detection of the amplitude of oscillation falling within preselected limits for a predetermined period of time.

Further objects, features and advantages of this invention will become apparent from a consideration of the following description, the appended claims and the accompanying drawings in which:

Figure 1:
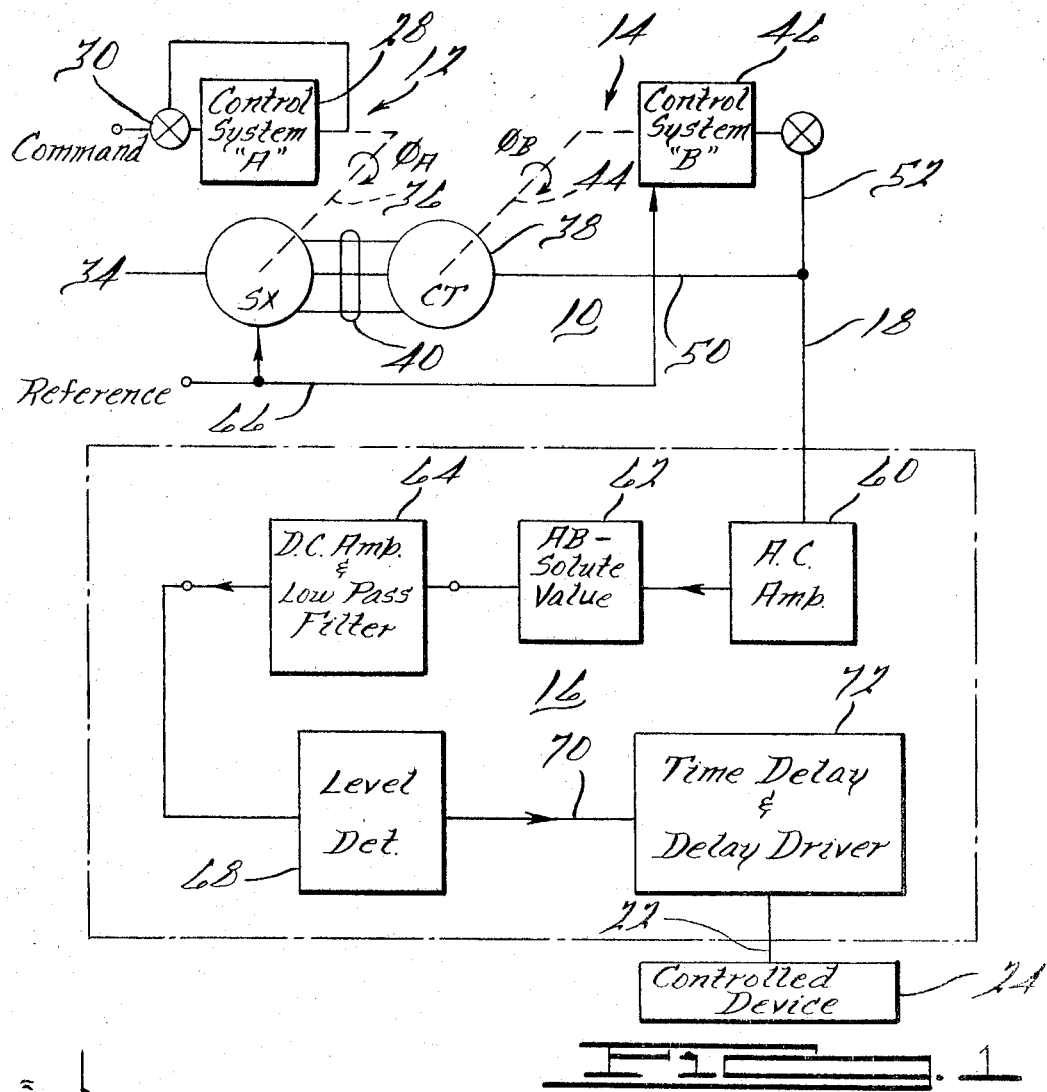
FIG. 1 is a block diagram of a preferred form of the present invention as incorporated into a positioning servo system.
Figure 2:
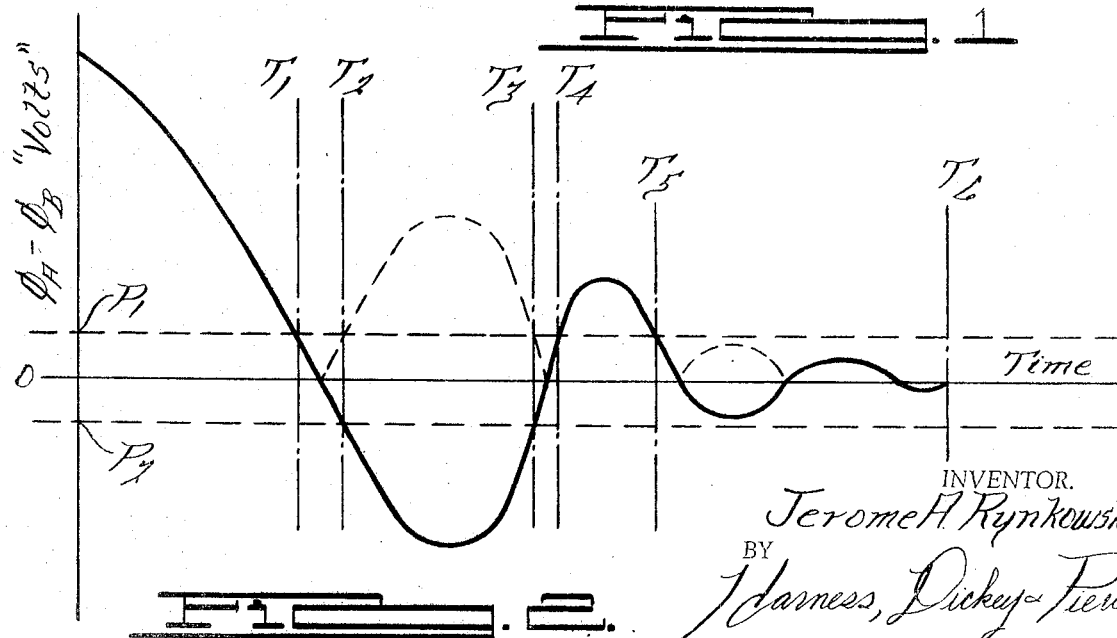
FIG. 2 is a wave form diagram illustrating the damped oscillatory wave train signal as generated in response to an error signal of a servo system.

Referring now to the drawings, and particularly to FIGS. 1 and 2, there is illustrated a positioning servo control system 10 which includes a synchro control transmitter system 12 which is utilized in generating position signals. These positioning signals are fed to a synchro control transformer system 14, commonly referred to as a slave system. An error signal is generated between the transmitter synchro system 12 and the slave synchro system 14, and this signal is fed to a null detection system 16 by means of a cable 18. The null detection system 16 senses the error signal generated in the servo system 10, the error signal taking the form of a damped oscillatory wave train signal due to the hunting effect of the slave system in attempting to achieve the null position commanded by the transmitter 12. For the purposes of this description a damped oscillatory wave train signal which is in suppressed carrier form is defined as a signal which is cyclical in nature and in which the amplitude thereof, above and/or below the null position, gradually diminishes toward zero.

As will be seen from the following description, the error signal on cable 18 is sensed by the null detection system 16 and a timing sequence is initiated each time the error signal reaches predetermined limits, either before or after the null position, and the timing sequence is terminated at such time as the error signal exceeds these predetermined limits. A detector device has been provided which senses the fact that the null signal has remained within the predetermined limits for a specified period of time. At this time the detector device provides an output signal on conductor 22 which is connected in controlling relation with a control device 24. The control device may take any form, as for example, a relay, an indicating device, in the form of a light, whistle or the like, or an inhibiting or enabling system wherein certain operations of the servo system 10 are enabled or inhibited in response to the generation of the output signal on conductor 22.

Referring to the servo system 10, and particularly to the synchro control transmitter portion 12, there is included a control system A circuit 28 which is adapted to receive command signals from a command input means 30. The command signals may take the form of mechanical command input signals wherein a member is positioned mechanically or may include an electrical command system wherein an electrical signal is generated and fed into the control system A to position portions of the synchro control transmitter 12. The command signal from the control system A is fed to a synchro control transmitter 34 by means of the movement of a shaft 36 which may take the form of rotational or angular movement thereof. The synchro control transmitter generates a signal in response to the position of the shaft 36, this signal being transmitted to a synchro control transformer 38 by means of a plurality of electrical conductors 40. The signals on conductors 40 may provide a control signal to position a shaft 44 of the slave system 14 by means of the synchro control transformer 38 or, as in the illustrated embodiment, the shaft 44 may be positioned by means of a control system B circuit 46 which is connected thereto.

The synchro control transformer 38 is devised to sense the command signal being generated by the synchro control transmitter 34. The control transformer 38 compares this command signal to the physical position of the shaft 44 and generates what may be termed an error signal, this error signal being impressed on an output conductor 50. The error signal on conductor 50 is directly related to the difference in angular position between the shaft 36 and the shaft 44. In order to control the position of shaft 44, the error signal on conductor 50 may be fed to the input circuit of the control system B circuit 46 by means of a conductor 52. Thus, the angular difference signal on conductor 50 provides a control signal to energize control system B circuit 46 in accordance with the difference in angles between the shafts 36 and 44. As the shaft 44 approaches the chosen angular null position, the error signal on conductor 52 gradually diminishes until such time as the shaft 44 reaches the exact position of the shaft 36.

As is well known in the art, and described above, the inertia of the shaft 44 and members connected thereto coupled with the power being supplied to move the servo system 14 causes a certain degree of hunting of the slave system 14 about the preselected null position. Accordingly, the amplitude of the differential voltage signal impressed on conductor 18 will take the form of a gradually decreasing amplitude wave until such time as the servo system shaft 44 reaches the null position wherein the shaft will tend to overshoot due to the inertia and power of the system. However, at this time the control system B circuit 46 generates a reversing signal, thereby causing the shaft 44 to slow down in its overshooting direction and finally reverse and tend to center the shaft 44 on the null position.

The error signal being in suppressed carrier form enables control system "B" to determine shaft direction. The reference signal is to be fed to the control system "B" by means of conductor 66 enabling the control system "B" to determine direction of shafts 36 and 44 by sensing the phase relationship.

The oscillations of the shaft 44 gradually diminish in amplitude until such time as the shaft 44 closely approximates the null position commanded by the synchro control transmitter 34. Referring to FIG. 2, the error signal is generated at time $T_0$ having an amplitude which is illustrated by $P_0$. The amplitude slowly diminishes until such time, at $T_1$, that the amplitude of the error signal is a preselected value, which may be of the order of .01 volt in the preferred system. The preselected voltage upper limit has been designated as $P_1$ and a lower limit of amplitude swing, which is approximately equal and opposite in phase to the voltage at $P_1$, has been designated $P_2$. The limits $P_1$ and $P_2$ may be varied for any particular system being utilized and generally would vary in accordance with the mass of the slave system being controlled. The wave form of FIG. 2 is merely illustrative of the operation of one form of the servo system. It is to be understood that the error signal may be generated to approach the null position from either one side or the other, depending on the type of servo system utilized.

As is further seen from FIG. 2, the error signal advances through the limit $P_1$ at time $T_1$ and thence passes through the null position at the zero voltage level wherein the error signal reverses in phase or polarity and advances toward the negative limit at voltage point $P_2$. The error signal crosses the limit $P_2$ at time $T_2$ and the system, through its own inertia, tends to further override the limit point $P_2$ until such time as the shaft reverses and again starts toward the null position. At time $T_3$ the error signal again crosses the negative limit at $P_2$ at time $T_3$ and advances toward the upper limit $P_1$ at time $T_4$, again crossing through the null point. The system continues to oscillate, reversing and advancing toward the null position by passing through the upper limit $P_1$ at time $T_5$. However, after time $T_5$, the system has sufficiently damped the oscillation of the shaft 44 to permit the error signal to remain within the limits of $P_1$ and $P_2$. The oscillations continue until such time as the shaft 44 exactly achieves the null position as illustrated by the zero volt level line or null position.

Referring back to FIG. 1, the error signal described in conjunction with FIG. 2 is fed to the null detector system 16 and particularly to an alternating current amplifier 60 by means of the conductor 18. The error signal on conductor 18 is amplified by means of the amplifier 60 and is thence fed to an absolute value circuit 62 wherein the absolute amplitude value of the signal from the AC amplifier is derived, irrespective of phase or polarity of the signal. The output of the absolute value circuit 62 is fed to a direct current amplifier and low pass filter system 64 which amplifies the absolute value signal and filters any extraneous noise signals from the error signal. Accordingly, the output of the direct current amplifier and low pass filter circuit 64 is an amplified reproduction of the wave described in conjunction with FIG. 2 with the exception that the portions of the wave below the null point would be reversed in polarity and appear above the null voltage line.

The output of the DC amplifier and low pass filter circuit 64 is fed to a level detection circuit 68, wherein the circuit 68 senses the occurrence of the error signal falling below the limit line $P_1$ (FIG. 2). Thus, the level detection circuit 68 senses the fact that the error signal is within the limits between the null position and the preselected upper limit line $P_1$. During this period the level detection circuit generates an output signal at output conductor 70 and this signal is fed to a time delay and relay driver circuit 72 to initiate a timing sequence in response thereto.

While the signal on conductor 70 has been described as the presence of a signal, it is to be understood that the contemplation of the invention includes either the lack of a signal during the period that the error signal is within the preselected limits or the presence of a signal during the same period. The time delay and relay driver circuit 70 commences a timing sequence which timing sequence proceeds until such time as either the error signal has again risen above the preselected limit line, as for example limit line $P_1$, or a preselected time interval has elapsed wherein the timing circuit contained within time delay and relay driver circuit 72 times out. At such time as the circuit times out, the signal on conductor 22 is generated and the control device 24 is energized.

Figure 3:
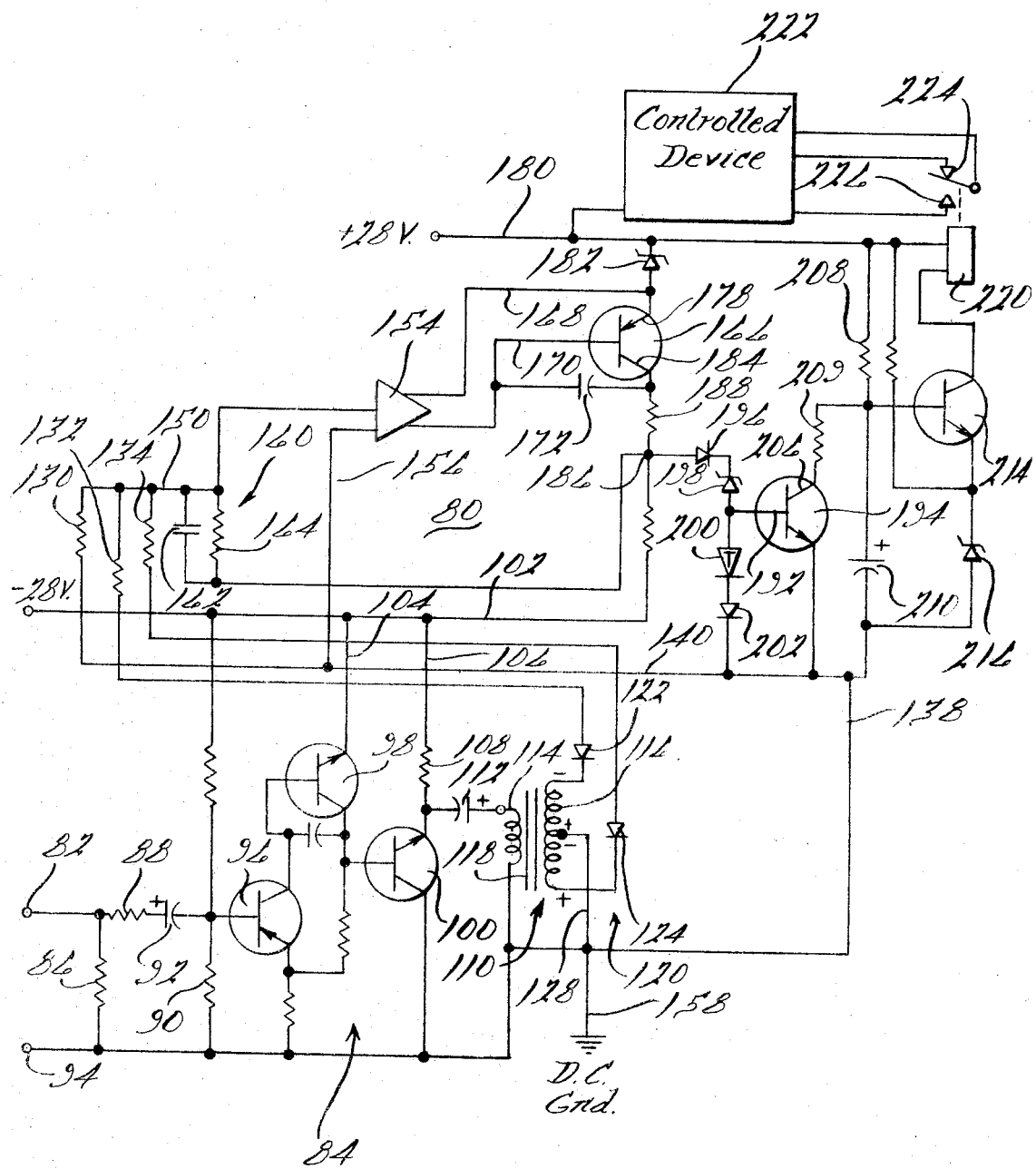
FIG. 3 is a schematic diagram illustrating the details of a preferred null detecting system as may be applied to a positioning servo system.

Referring now to FIG. 3, there is illustrated a preferred form of a null detection system 80 which is adapted to be utilized in conjunction with the servo system 10 described above. Specifically, an input error signal is fed to an input terminal 82 and thence is fed to an alternating current amplifier 84 by means of a plurality of resistors 86, 88 and 90 and a DC blocking capacitor 92. The input alternating current voltage is developed across the resistor 86 by means of the input terminal 82 and a second input terminal 94. The alternating current amplifier is of the conventional type and includes a plurality of transistors 96, 98, 100 which are connected in cascade to provide increasing amplification of the input signal at input terminals 82 and 94. The emitters of transistors 98 and 100 are connected to a negative source of DC potential at conductor 102 by means of conductors 104, 106 and an emitter current limit resistor 108. The output signal from the alternating current amplifier is fed to a center tapped transformer 110 by means of a capacitor 112.

Specifically, the alternating current output signal from alternating current amplifier 84 is fed through a primary winding 114 which is magnetically coupled to a center tapped secondary winding 116 by means of a core member 118. The output signal of the secondary center tap winding 116 is fed through an absolute value circuit 120, taking the form of a pair of rectifying diodes 122, 124. The secondary winding 116 is center tapped by means of a conductor 128 and the voltage generated across each half of the secondary winding 116 is developed across a resistor 130 and a pair of second resistors 132, 134. Accordingly, when the voltage at the upper portion of the winding 116 is positive with respect to the voltage at the lower portion, a circuit will be completed through the lower half of the secondary winding 116, the center tap conductor 128, a conductor 138, a further conductor 140, resistor 130, resistor 134 and diode 124. Similarly, when the voltage reverses and the lower end of winding 116 is positive with respect to the upper end, a circuit is completed through the upper half of the winding 116, the conductors 128, 138 and 140, the resistor 130, the resistor 132 and diode 122.

The interconnection of the resistors 130 and 132 and 134 at a conductor 150 causes a summation of the signal generated during each half cycle thereby providing a unidirectional pulsating signal at the summing point on conductor 150. It is to be noted that the signal produced at the output conductors of diodes 122 and 124 is the absolute value of the signal generated through the transformer 110 thereby eliminating polarity sensitivity from the signal being fed to the summing point 150.

The input signal from the summing conductor 150 is fed to the input circuit of a differential amplifier 154 which may include a second input or reference signal being fed thereto by means of a conductor 156. In the preferred embodiment, the conductor 156 is connected to DC ground potential by means of conductors 140, 138 and a conductor 158. Accordingly, the output signal from the amplifier 154 varies in direct relation to the magnitude of the input alternating current oscillatory wave train being fed to input terminals 82 and 94. A suitable filter 160 consisting of capacitor 162 and resistor 164 provides filtering for the differential amplifier 154, as is common in the art. The output of differential amplifier 154 is fed to a transistor amplifier 166 by means of conductors 168 and 170 wherein a suitable filter capacitor 172 has been provided, as is well known in the art. The transistor 166 includes an emitter electrode 178 connected to a source of positive direct current potential at conductor 180 through a Zener diode 182. A collector electrode 184 is connected to a node 186 by means of a current limit resistor 188, thereby generating a potential at node 186 which varies in accordance with the conduction of transistor 166.

As is seen from the foregoing description, the greater the input signal to input terminal 82, 94, the greater the conduction of transistor 166, thereby drawing the node 186 closer in potential to the DC voltage level on conductor 180. As the input signal impressed on input terminal 82, 94 is decreased due to the approaching of the slave system to the null position, the conduction of transistor 166 diminishes, and the less positive the voltage at node 186. The voltage level at node 186 is fed to a base electrode 192 of a transistor 194 by means of a combination of diode 196, a Zener diode 198, a tunnel diode 200 and a second diode 202. Thus, as long as the voltage at node 186 exceeds the Zener breakdown voltage of Zener diode 198, current will flow through the path consisting of diodes 196 and 202, Zener diode 198 and tunnel diode 200. This flow of current exceeds the peak current level of tunnel diode 200. The tunnel diode being a bi-stable device, the tunnel diode reverts to a high impedance state, thereby shunting the current flow to the base emitter path of transistor 194 causing it to conduct. When the voltage at node 186 reaches a point equal to or below the Zener breakdown voltage of Zener diode 198, the flow of current to transistor 194 will cease, thereby switching transistor 194 to the nonconductive state. This turnoff point may be chosen to be, for example, at the upper voltage limit point described as level $P_1$ in conjunction with FIG. 2, thereby turning the transistor off when the amplified error signal drops below a value equivalent to the unamplified error signal dropping below point $P_1$.

The diode 196 has been placed in the circuit to provide a safety device against an over voltage condition existing at the base emitter electrode of transistor 194. Diode 202 has been provided to compensate for temperature variations in transistor 194, as is common in the art, and tunnel diode 200 has been provided to further enhance the sharp turn-on characteristics of transistor 194. Transistor 194 includes a collector electrode 206 connected to the positive source of DC potential at conductor 180 by means of a resistor 208 and a second resistor 209. During the period when the transistor 194 is conductive, a current path is provided from source 180 through resistors 208, 206, transistor 194 to conductor 140.

A capacitor 210 has been connected in shunt relation with the collector emitter circuit of transistor 194 whereby the capacitor 210 is substantially short circuited during the period when the transistor 194 is conductive, and is in a charging state when the transistor 194 is nonconductive. The capacitor 210, during the period when the transistor 194 is nonconductive, is charged through an RC timing circuit including resistor 208 and capacitor 210, from the source 180 to ground potential at conductor 158. The quantity of charge on and the voltage across capacitor 210 is directly related to the duration that the transistor 194 is in the nonconductive state. The voltage across the capacitor 210 is sensed by means of the base-emitter circuit of a transistor 214 and a Zener diode 216. When the charge on capacitor 210 exceeds the Zener breakdown voltage of Zener diode 216 and the forward base to emitter threshold voltage of transistor 214, the transistor 214 will be rendered to the conductive state thereby completing a current path through an output relay 220.

However, the duration of the conductive state of transistor 194 is directly related to the condition of the voltage at node point 186 being below the preselected limit value determined by the combination of diodes including the Zener diode 198. Thus, if the voltage at node 186 drops below the preselected limit value for a period of time which is less than the amount of time necessary to charge 210 sufficiently to breakdown the Zener diode 216, the transistor 196 will again be switched to the conductive state thereby discharging capacitor 210. In this situation the transistor 214 will remain in the nonconductive state. However, if the transistor 194 is turned on for a sufficient duration of time, indicating that the voltage at node 186 has remained below the preselected limit for the preselected time interval, the capacitor 210 will be allowed to charge sufficiently to breakdown the Zener diode 216 and energize the relay 220 or control device.

The energization of the relay 220 my be the final result achieved or the relay 220 may be utilized to energize a further control device 222 by means of a pair of contacts including a normal contact 224 and a transfer contact 226. Thus the armature of the relay 220 is drawn into contact with the transfer contact 226 to energize the control device 222. As stated above, the control device may take any form, as for example a light, an audible signal, an enabling mechanism or a disabling mechanism, the device 222 being chosen to fit the particular circumstances or environment of the circuit in which it is being used.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. The method of detecting when the amplitude of a damped oscillatory signal generated in a closed loop servo system is within a preselected limit which comprises the steps of establishing a reference level about which the oscillatory signal oscillates in a positive and negative sense, sensing the oscillatory signal, initiating timing of an interval each time the difference in amplitude of said wave from said reference level changes to a value which is within said preselected limit, terminating timing of said interval each time the difference in amplitude of said wave from said reference level in at least one sense changes to a value which is without said preselected limit, and producing an output signal when the timed interval exceeds a preselected duration.

2. The method of claim 1 further including the step of deriving the absolute amplitude value of the sensed signal and wherein said timing is terminated in response to said difference in amplitude being without said limit in both senses.

3. The method of claim 2 further including the step of generating an intermediate control signal having at least a first and second state, said first state occurring when said sensed signal is without said preselected limits and said second state occurring when said second signal is within said preselected limits, and initiating said timing when said intermediate control signal is in said second state.

4. The method of detecting when an object moving in a damped oscillatory manner about a preselected position in both directions from said preselected position with an amplitude which diminishes with time is at a selected position within preselected lmits which comprises the steps of detecting the difference between the position of said object and said selected position in at least one of a positive or negative sense, timing the duration of each interval in which said difference is within said preselected limits and detecting when the duration of any one of said intervals exceeds a preselected time.

5. The method of claim 4 further including the step of generating an electrical signal having an amplitude which varies as a function of the difference between the position of said object and said selected position and wherein the step of detecting includes sensing said electrical signal.

6. The method of claim 5 further including the step of deriving the absolute amplitude value of said generated electrical signal.

7. The method of claim 6 further including the step of generating an intermediate control signal having at least a first and second state, said first state occurring when said generated signal is without said preselected limits and said second state occurring when said second signal is within said preselected limits, and wherein said timing occurs when said intermediate control signal is in said second state and terminating timing when said intermediate control signal is in said first state.

8. A system for detecting when the amplitude of a damped oscillatory signal generated in a closed loop servo system is within a preselected limit comprising means for establishing a reference level about which the signal oscillates in a positive and negative sense, means for sensing the oscillatory signal, means for initiating timing of an interval each time the difference in amplitude of said wave from said reference level changes to a value which is within said preselected limit, means for terminating timing of said interval each time the difference in amplitude of said wave from said reference level in at least one sense changes to a value which is without said preselected limit, and means for producing a signal when the timed interval exceeds a preselected duration.

9. The system of claim 8 further including means for deriving the absolute amplitude value of the sensed signal and wherein said timing is terminated in response to said difference in amplitude being without said preselected limit in both senses.

10. The system of claim 9 further including means for generating an intermediate control signal having at least a first and second state, said first state occurring when said sensed signal is without said preselected limits and said second state occurring when said second signal is within said preselected limits, and means for initiating said timing when said intermediate control signal is in said second state and terminating said timing when said control signal is in said first state.

11. A system for detecting when an object moving in a damped oscillatory manner about a preselected position in both directions from said preselected position with an amplitude which diminishes with time is at a selected position within preselected limits comprising means for detecting the difference between the position of said object and said selected position in at least one of a positive or negative sense, means for timing the duration of each succeeding interval in which said difference is within said preselected limits and means for detecting when the duration of any one of said intervals exceeds a preselected time.

12. The system of claim 11 further including means for generating an electrical signal having an amplitude which varies as a function of the difference between the position of said object and said selected position and wherein said means for detecting includes means for sensing said electrical signal.

13. The system of claim 12 further including means for deriving the absolute amplitude value of said generated electrical signal and means for terminating the timing in response to said difference in amplitude being without said limit in both senses.

14. The system of claim 13 further including means for generating an intermediate control signal having at least a first and second state, said first state occurring when said generated signal is without said preselected limits and said second state occurring when said second signal is within said preselected limits, and means for rendering said timing means operative when said intermediate control signal is in said second state and rendering said timing means inoperative when said intermediate control signal is in said first state.

15. The system of claim 14 wherein said sensing means includes an alternating current amplifier connected to receive said signal, an absolute value circuit connected to said alternating current amplifier for deriving an absolute value of said signal including transformer means and rectifier means connected on the output side of said transformer means and summing means connected to said absolute value means for summing the output signals from said absolute value circuit, said intermediate control signal generating means including voltage level responsive means coupled to said absolute value circuit through coupling means having at least two states of conduction, said timing means including an RC timing circuit wherein the capacitor thereof is charged during the occurrence of said second state, and said detecting means includes first means connected in voltage sensing relation to said capacitor for sensing the charge on said capacitor and means rendering said first means operative when said charge reaches a preselected level as determined by lapsed time.

16. In a system for driving a massive object from a remote position to a selected position and for successively reversing the direction of drive of the massive object as it overshoots the selected position to bring the massive object to said selected position in a series of alternating movements of progressively diminishing amplitude about a reference level, the combination of setting means for setting the selected position, sensing means for sensing the instant position of the massive object, detecting means for detecting the difference between said selected position and said instant position, and control means for detecting when said difference is less than a preselected limit value for a preselected time interval.

17. The combination of claim 16 in which said control means further includes timing means, means for initiating timing each time said difference is less than said preselected limit value, means for terminating timing each time said difference is greater than said preselected limit value, and means actuated in response to the timing of an interval greater than a preselected time interval.

18. The system of claim 17 further including means for generating an intermediate control signal having at least a first and second state, said first state occurring when said generation signal is without said preselected limits and said second state occurring when said second signal is within said preselected limits, and means for rendering said timing means operative when said intermediate control signal is in said second state and rendering said timing means inoperative when said intermediate control signal is in said first state.

19. The system of claim 18 wherein said sensing means includes an alternating current amplifier connected to receive said signal, an absolute value circuit connected to said alternating current amplifier for deriving an absolute value of said signal including transformer means and rectifier means connected on the output side of said transformer means and summing means connected to said absolute value means for summing the output signals from said absolute value circuit, said intermediate control signal generating means including voltage level responsive means coupled to said absolute value circuit through coupling means having at least two states of conduction, said timing means including an RC timing circuit wherein the capacitor thereof is charged during the occurrence of said second state, and said detecting means includes first means connected in voltage sensing relation to said capacitor for sensing the charge on said capacitor means rendering said first means operative when said charge reaches a preselected level as determined by lapsed time.

References Cited
UNITED STATES PATENTS

| | | | |
|---|---|---|---|
| 2,978,615 | 4/1961 | Chater | 307—233 X |
| 3,001,100 | 9/1961 | Schuh et al. | 307—235 X |
| 3,015,042 | 12/1961 | Pinckaers | 307—233 X |
| 3,069,558 | 12/1962 | Burt et al. | 307—233 |
| 3,075,127 | 1/1963 | Secunde et al. | 307—233 X |
| 3,233,118 | 2/1966 | Jensen | 307—233 X |
| 3,296,497 | 1/1967 | Slattery | 307—235 X |
| 3,305,732 | 2/1967 | Grossman et al. | 307—233 |
| 3,334,272 | 8/1967 | Lipnitz. | |

THOMAS E. LYNCH, Primary Examiner

U.S. Cl. X.R.

307—233